L. J. R. HOLST.
AUTOMATIC FOCUSING APPARATUS FOR PHOTOGRAPHIC LENSES.
APPLICATION FILED MAY 8, 1911.

1,029,295.

Patented June 11, 1912.
6 SHEETS—SHEET 1.

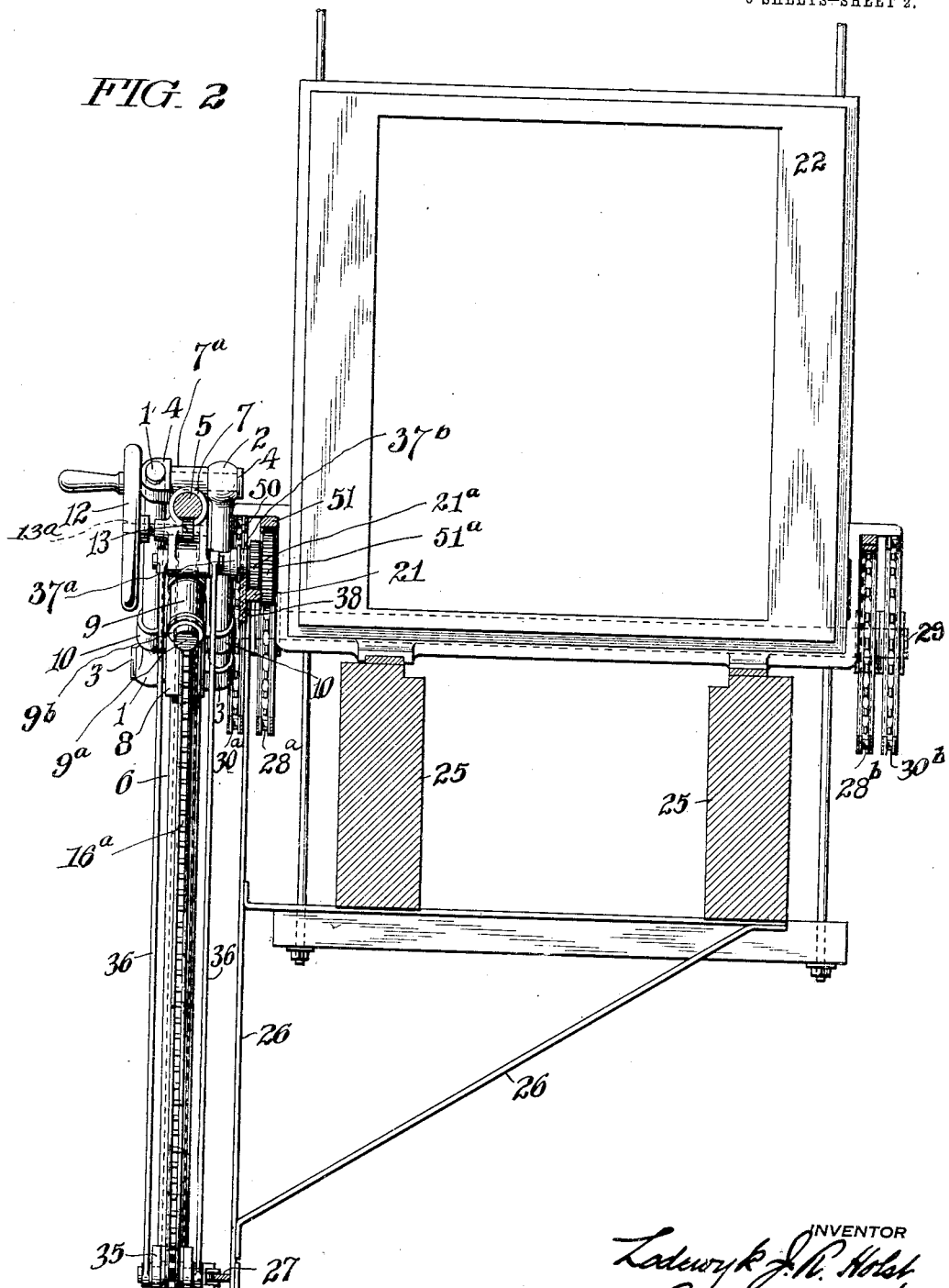

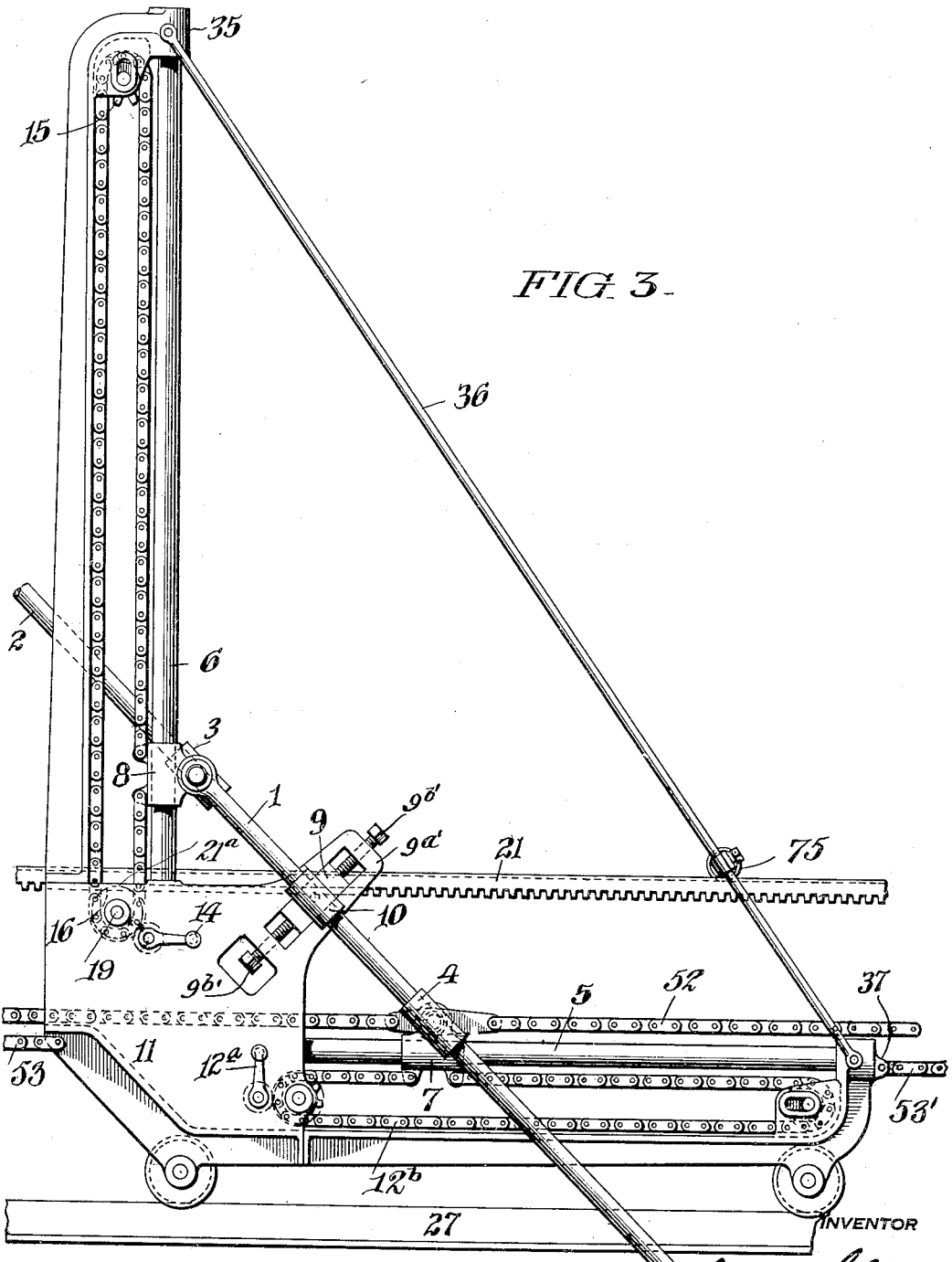

L. J. R. HOLST.
AUTOMATIC FOCUSING APPARATUS FOR PHOTOGRAPHIC LENSES.
APPLICATION FILED MAY 8, 1911.
1,029,295.
Patented June 11, 1912.
6 SHEETS—SHEET 4.
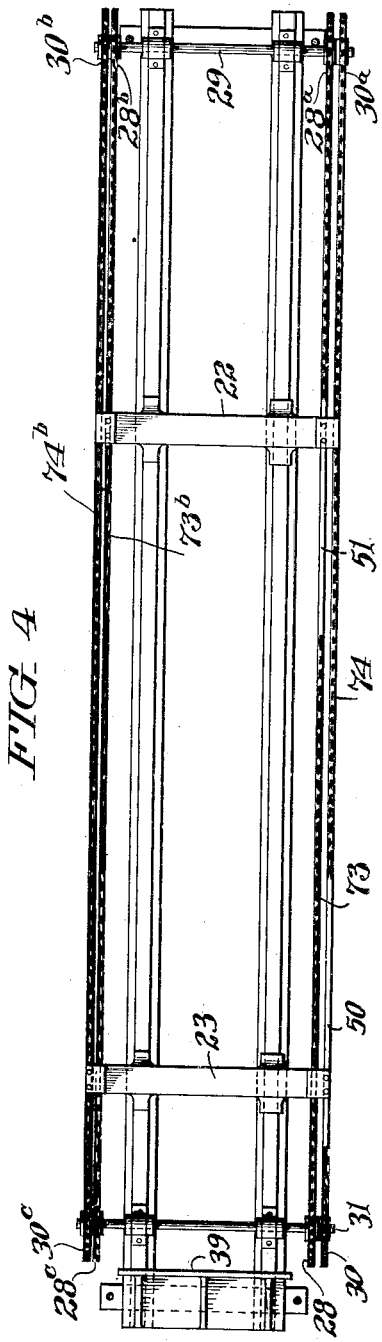
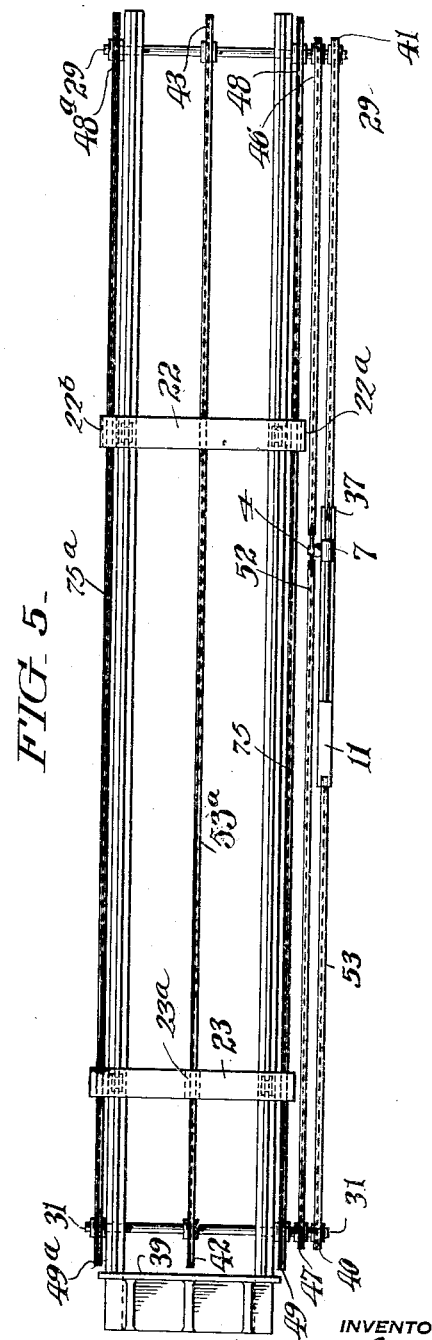
WITNESSES
INVENTOR
BY
ATTORNEY L. J. R. HOLST.
AUTOMATIC FOCUSING APPARATUS FOR PHOTOGRAPHIC LENSES.
APPLICATION FILED MAY 8, 1911.

1,029,295.

Patented June 11, 1912.

6 SHEETS—SHEET 5.

FIG. 6.a

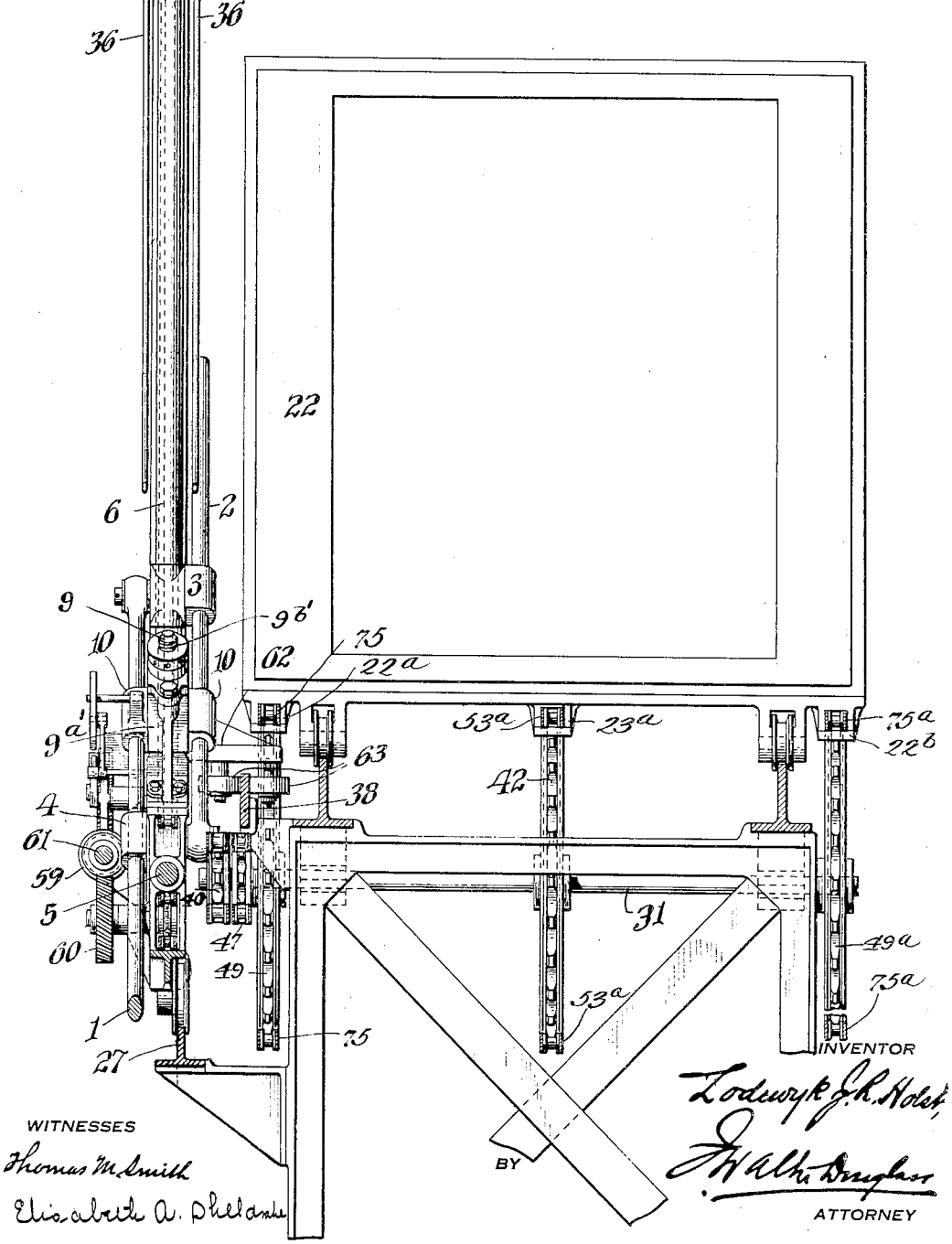

UNITED STATES PATENT OFFICE.

LODEWYK J. R. HOLST, OF LANSDOWNE, PENNSYLVANIA, ASSIGNOR TO WILLIAMS, BROWN AND EARLE, INC., OF PHILADELPHIA, PENNSYLVANIA, A CORPORATION OF PENNSYLVANIA.

AUTOMATIC FOCUSING APPARATUS FOR PHOTOGRAPHIC LENSES.

1,029,295.  Specification of Letters Patent.  Patented June 11, 1912.

Application filed May 8, 1911. Serial No. 625,872.

*To all whom it may concern:*

Be it known that I, LODEWYK J. R. HOLST, a citizen of the United States, residing at Lansdowne, in the county of Delaware and State of Pennsylvania, have invented certain new and useful Improvements in Automatic Focusing Apparatus for Photographic Lenses, of which the following is a specification.

My invention relates to the provision of means in focusing photographic lenses to positively establish and maintain certain, the conjugate-foci, by utilizing in and by such means, the geometrical property of a rectangular triangle in which the hypotenuse of the triangle, if swung about a point in itself at equal distances from the rectangular sides of the triangle, intersects the rectangular sides of such triangle at points, which not only are adapted to positively establish such conjugate-foci, but also with certainty maintain the true mathematical relation of the conjugate-foci previously established.

According to my invention it is to be understood that focusing is the relative adjustment of a lens with relation to an object, and the image thereof which such lens projects.

The principal object of my present invention is to provide means to establish and maintain the conjugate-foci in adjustments or shiftings to various positions as required of a lens and of the support for the image to enable the image to bear an exact predetermined ratio of enlargement or of reduction to the object.

It is a well known fact that in focusing in the customary manner it has been possible in practice to obtain only approximately a predetermined relation of size hitherto restricted to a margin within about two per cent. of the real size required.

Some of the convenient forms of carrying out my invention which have been found practically efficient are shown in the accompanying drawings forming part hereof, in which—

Figure 1:
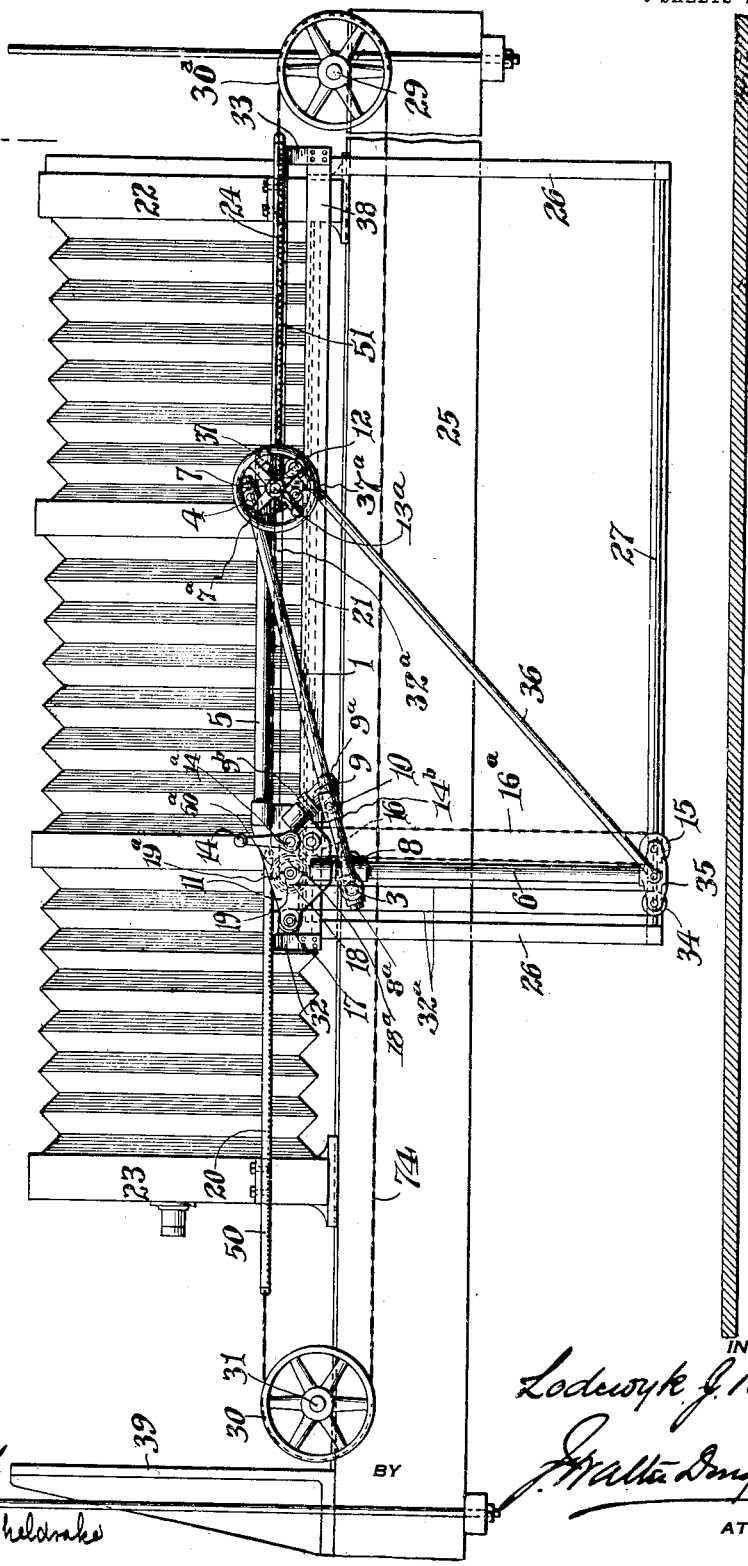
Figure 6:
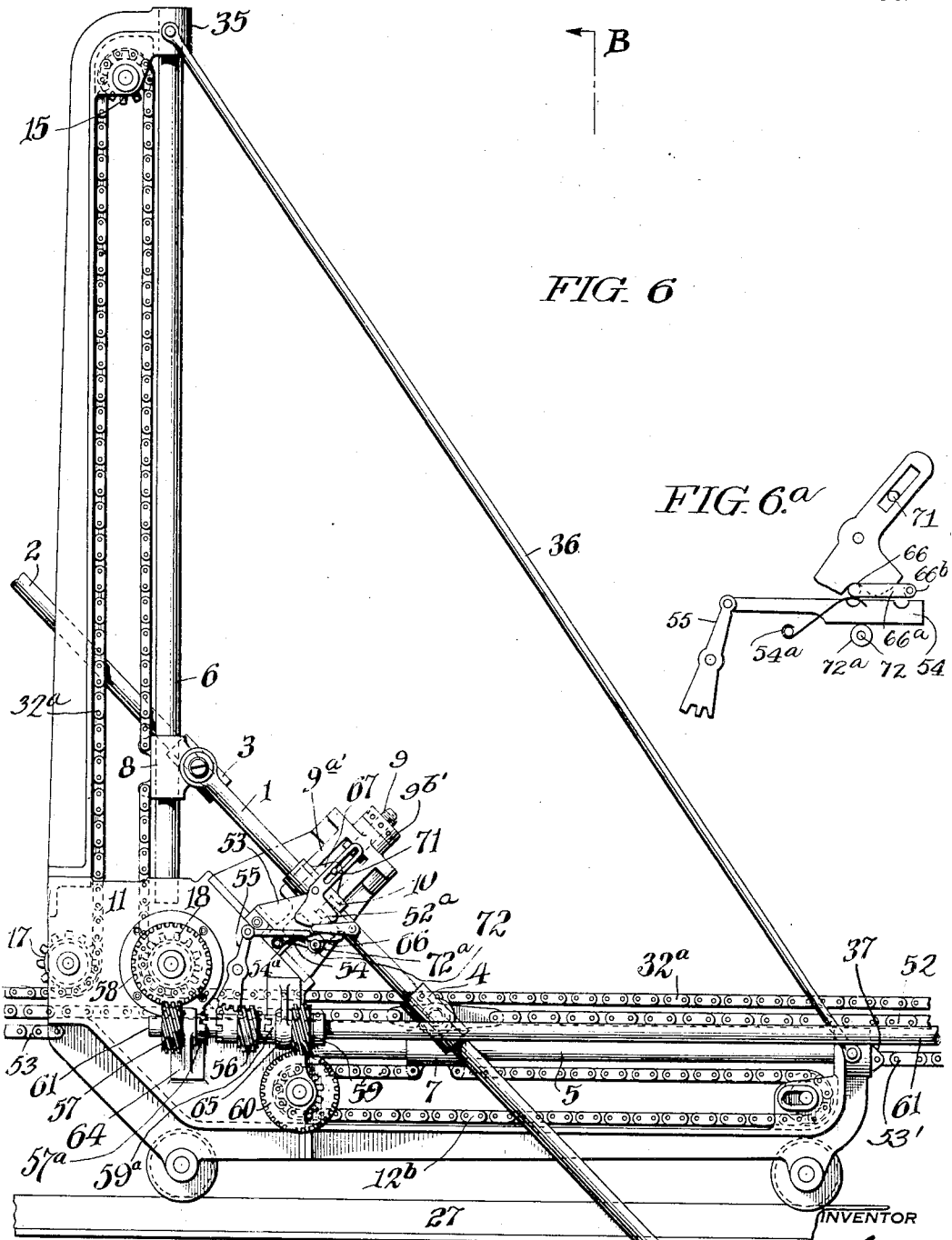

Figure 1, represents a side elevational view, partly in broken section of an apparatus as employed with a type of camera in common use for photo-mechanical work, embodying features of my present invention. Fig. 2, is an elevational view in cross-section on the line A, A, of Fig. 1, but drawn to a larger scale than shown therein. Fig. 3, is a side elevational view of a part of a modified form of the apparatus, in which the vertical guide-arm occupies, as shown, an upright position with respect to the camera-bed. Figs. 4 and 5, are respectively plan views of the camera-bed of Fig. 1, showing modified means, whereby movement of the focusing device may be communicated in increased proportions to the lens and plate holding frames of the camera, embodying further features of my said invention. Fig. 6 is a side elevational view of the modified type of the device as shown in Fig. 3, showing additional means to operate the same through the entire range thereof from maximum reduction to maximum enlargement in employing the same operating shaft. Fig. 6$^a$, is an enlarged view in side elevation of the locking device adapted to coöperate with the rocker-arm of the fulcrum slide. Fig. 7, is a cross-sectional elevation on the line B—B of Fig. 6, drawn to the same scale and showing means to support the mechanism on the camera-bed and operative-connections between said mechanism and the lens and plate supports.

In these drawings corresponding parts in the various figures have been indicated by the same numerals.

The drawings show adaptations of my present invention to cameras in which the object support is stationary in order that required movements may be communicated to the lens and plate-holding frames.

Referring to the drawings, the apparatus comprises a corner-plate 11, to which are attached guide-bars or tracks 5 and 6, arranged at right angles to each other and strengthened by stay-rods 36, attached to a bracket 35, at the lower end of the guide-bar 6, and to a bracket 37, at the rear end of a guide-bar 5. The corner plate 11, also carries a short pin 9$^a$, to support a sleeve 9, which can be adjusted toward and away from the corner-plate 11, by lock-nuts 9$^b$. The sleeve 9, carries oscillatory fulcrumed guides 10, in such a manner that, when the sleeve is adjusted on its supporting pin 9$^a$, the center of the fulcrumed guides will travel in a line bisecting the right angle formed by the guide-bars 5 and 6, consequently the center of the oscillatory fulcrumed guides 10, will at all times be equidistant from the guide-bar 5 and the guide-bar 6. The guide-bar 5, carries a sleeve 7, and the guide-bar 6, carries a sleeve 8, both of which are adapted to slide along these bars under the control of a pair of adjacent slide-rods 1 and 2. The sleeve 7, on the guide-bar 5, and the sleeve 8, on the guide-bar 6, are provided with lugs 7$^a$ and 8$^a$, respectively, through which holes are drilled transversely to the direction of the said guide-bars, to serve as bearings for the pivot-pins 4 and 3 respectively. Fig. 2, clearly shows the pivot-pin 4, which carries on its inner extremity the head of the slide-rod 2, and supports in the cylindrical opening of its outer part the end of the slide-rod 1. Fig. 2, also shows the pivot-pin 3, in the lug 8$^a$ of sleeve 8, on the guide-bar 6, inserted in a direction opposite to that in which the pivot pin is placed in the sleeve 7, to serve as a pivot for the head-end of the slide-rod 1, and as a guide for the free end of the slide-rod 2. The slide rods 1 and 2, pass also through the fulcrumed guides 10, as clearly shown in Figs. 1 and 2. The underside of the guide-bar 5, forms a rack in the teeth of which engages a pinion 13, Fig. 2, mounted on a spindle 13$^a$ carried by suitable projections of the sleeve 7. The hand-wheel 12, affords means for the rotation of the pinion 13, and thereby movement of the sleeve 7, along the said guide-bar 5.

The corner-plate 11, carries a sprocket 16, around which passes a chain or other suitable flexible band 16$^a$, to a similar sprocket 15, pivoted on the bracket 35, at the foot of the guide-bar 6. Both ends of the chain or band 16$^a$, are attached to the sleeve 8, in a manner clearly shown in Fig. 3. The sprocket 16, is rotated by means of a crank-handle 14, carrying a pinion 14$^a$, meshing with a spur-wheel 14$^b$, mounted on the spindle of the sprocket 16 behind said sprocket.
The rotation of the handle 14, thus will cause the sleeve 8, to travel along the guide-bar 6. However, it should be understood that when the movable sleeves and slide-rods are in the position shown in Figs. 1 and 2, movement can be imparted only by means of the hand-wheel 12, actuating the sleeve 7, which on being impelled toward the corner-plate 11, will cause the sleeve 8, to slide in a downward direction on the guide-bar 6, while any attempt at moving the sleeve 8, by means of the crank-handle 14, will only result in straining the mechanism, but cannot give motion in either direction to the sleeve 7. This condition prevails until the sleeves 7 and 8, and the slide-rods 1 and 2, have reached the central position of their course, as shown in Fig. 3. In case the sleeve 7, must be moved nearer to the corner-plate 11, than the central position, the motive power must be applied by means of the hand-crank 14, to the sleeve 8, on the guide-bar 6, which sleeve on being impelled away from the corner-plate 11, will cause a further approach of the sleeve 7, toward the said plate. In general, it will be seen that the motive power for the operation of the said mechanism must be applied to the sleeve which travels between the central position and the outward limit of its stroke and it is immaterial whether it moves toward or away from the central position. This demonstrates that the point of application of the motive power changes when the parts reach the central position and are to be driven farther in the same direction. The carriage formed by the corner-plate 11, and the guide bars 5 and 6, is held in proper position with regard to the bed of the camera by means of brackets 26, a lower lateral bar 27 and an upper lateral bar 38, as clearly shown in Figs. 1 and 2.

As illustrated in the drawings, the object-support 39 is immovable and the different proportions between object and image are obtained by imparting movement to the lens and the image receiving surface. This makes it necessary to provide means whereby the carriage can move longitudinally relative to the bed of the camera, as much as the sleeve 8, moves vertically along the guide-bar 6. This longitudinal movement is mechanically obtained by means of the following devices or their equivalents.

The corner-plate 11, carries a spindle 19, and the end-bracket 37, carries a spindle 37$^a$, Figs. 1 and 2, both projecting toward the camera-bed 25. On these spindles are mounted grooved pulleys 19$^a$ and 37$^b$, Figs. 1 and 2, rolling on the upper edge of the bar 38, as illustrated in Figs. 1 and 2. At either end of the lateral bar 38, are attached right-angle brackets 32 and 33. These brackets support on their horizontal flanges, a flexible band 32$^a$, drawn taut and passing from the bracket 32, over the drum 17, on the corner-plate 11, over the drum 34, on the bracket 35, then upward over the drum 18, on the corner-plate 11, and then rearward to the bracket 33. The drum 18, is loosely mounted on the spindle 19, which carries the grooved-pulley 19$^a$. This pulley has a diameter corresponding with that of the drum 18. The part of the flexible band situated between the drum 34, and the drum 18, is attached to a lug on the sleeve 8, so that any movement of the sleeve along the guide-bar 6, will cause a corresponding movement of the carriage formed by the corner plate 11 and parts attached thereto, along the supporting bar 38. When the sleeve 8, moves downward it will cause an equal amount of rearward movement of said carriage and when the sleeve 8, moves upward it will cause an equal amount of forward movement thereof. In this manner the longitudinal displacement of the carriage produces movement of the lens, while the simultaneous movement of the sleeve 7, over the guide-bar 5, produces a corresponding movement, of the image receiving surface.

As the required amount of displacement for any given relation of size between the object and image is directly proportional to the equivalent focal length of the lens, and these focal lengths vary in practice between wide limits, there is provided means, whereby the actual amount of movement produced by the device of my invention, can be multiplied by factors conveniently obtainable in gears, whereby one standard size of mechanism may be made to operate lenses of any focal length met with in actual practice. To this end, the sleeve 9, supported on the angular extension of the corner-plate 11, is adjustable between limits permitting of the bringing of the center of the oscillatory fulcrumed guides 10, at any point between say 6 and 7 inches distance from the lines of motion of the centers of the pivots 3 and 4. The exact distance of the center of the oscillatory fulcrumed guides 10, to the said center lines of motion is called the master focus of said mechanism, which master focus when multiplied by the ratio of the gearing, must be equal to the equivalent focus of the lens used.

By using gears of varying proportions of say, 1 to 2; 1 to 2½; 1 to 3; 1 to 3½; 1 to 4; the aforesaid apparatus can be applied to lenses of any focal length from 12″ to 28″, and thus embrace practically all classes of work, in every-day practice. In Figs. 4 and 5, are illustrated two modes of communicating such multiplied movement of the focusing mechanism to the lens and image supporting frames, in plan. Fig. 5, illustrates a suitable multiplication device for use in connection with the apparatus of the types illustrated in Figs. 3, 6 and 7. In Fig. 5, the corner-plate 11, stands for the carriage of the focusing mechanism and the sleeve 7, represents the corresponding part of Figs. 3, 6 and 7. A chain or other suitable flexible band 53, is stretched from the corner-plate 11, Fig. 5, over a sprocket 40, on the spindle 31, at right angles to the camera-bed, and near the object surface 39, and passes then rearwardly over the sprocket 41, loosely mounted on the end of the spindle 29, and then forwardly to the end of the bracket 37. The spindle 31, also carries keyed to it a sprocket 42, over which is carried an endless chain 53$^a$, supported on a like size, but freely revolving, sprocket 43, on the spindle 29. The bottom board of the lens carrying frame 23, is attached to the upper stretch of the chain 53$^a$ by means of the downwardly projecting lugs 23$^a$. The amount of movement of the corner-plate 11, will thus be transmitted to the lens supporting frame 23, in proportion to the diameters of the sprockets 40 and 42. In like manner the movement of the sleeve 7, is transmitted to the plate-support 22. The inwardly projecting pivot of the oscillatory guide 4, attached to the sleeve 7, is the driving point of an endless chain 52, which is stretched around the sprockets 46 and 47 carried respectively, by the spindles 29 and 36. The sprocket 47, is freely mounted on its spindle and the sprocket 46 is keyed to the spindle 29. The large sprockets 48 and 48$^a$, are also keyed to the spindle 29, whereas the similar sprockets 49 and 49$^a$, rotate freely on the spindle 31. Endless chains 75 and 75$^a$, are stretched around the sprockets 48, 49 and 48$^a$ 49$^a$, respectively, and will thus be driven through the same increased distances relative to the course of the pivot of the guide 4, as is the case of the chain 53$^a$, relative to the course of the carriage 11, as all the small and large sprockets bear the same relations to each other. Suitable clamps 22$^a$ and 22$^b$, projecting downwardly from the plate-carrier 22, attach the latter to the chains 75 and 75$^a$, and finally communicate the required movement to the image surface.

The mode of transmission illustrated in Fig. 4, is a mechanical modification of the means illustrated in Fig. 5, and is adapted for use in connection with a focusing mechanism of the type illustrated in Figs. 1 and 2. The endless chain 74, passes over the sprocket 30, keyed to the spindle 31 and thence rearward to the like size sprocket 30$^a$, loosely mounted on the spindle 29. Movement is communicated to the chain 74, through the action of the spur-gear 50$^a$, on the rack 50, as shown in Figs. 1 and 4. The spur-gear 50$^a$, is keyed to the spindle 19, which also carries freely mounted on it the drum 18, and keyed to it the grooved pulley 19$^a$, and the pinion 18$^a$, which latter meshes with the stationary rack 21. The amount of movement of the chain 74, is thus determined by the proportion of the pitch diameters of the pinion 18$^a$, and the spur-gear 50$^a$.

In Fig. 2, is clearly illustrated the grooved pulley 37$^b$, the pinion 21$^a$, and the spur-gear 51$^a$, all keyed to the spindle 37$^a$, carried in downwardly projecting lugs of the sleeve 7. The pinion 21$^a$, of the same diameter as the pinion 18$^a$, meshes with the stationary rack 21, and the spur-gear 51$^a$, is of the same diameter as the spur-gear, 50$^a$, and meshes with the rack 51, which is inserted in the endless band formed by the chain 73. This chain is stretched over the sprocket 28, loosely mounted on the spindle 31, and over the sprocket 28$^a$, keyed to the spindle 29. The spindles 29 and 31 carry at their opposite ends similar sprockets 28$^b$, 30$^b$ and 28$^c$, 30$^c$, respectively. Of these, the sprocket 30$^c$, is keyed and the sprocket 28$^c$, is freely mounted on the spindle 31, and the sprocket 28$^b$, is keyed and the sprocket 30$^b$, is freely mounted on the spindle 29. These sprockets serve to carry endless chains 73$^b$ and 74$^b$. The sprocket 30$^c$, is keyed to the spindle 31, and the sprocket 28$^b$, is keyed to the spindle 29, which arrangement results in the communication of movement to the chain 73$^b$, equal to that of the chain 73, and thus to provide means to fasten the lens supporting frame 23, to the chains 74 and 74$^b$, and the image supporting frame 22 to the chains 73 and 73$^b$, to thereby finally transmit the movement of the corner-block 11, and sleeve 7, respectively, to these parts in an increased ratio determined by the relation of the pinions 18$^a$ and 21$^a$, to the spur-gears 50$^a$ and 51$^a$.

In Fig. 3, is illustrated a modification of the manner of adjusting the oscillatory fulcrumed guides 10 in the slot 9$^{a'}$ by means of the set screws 9$^{b'}$, at different distances from the rectangular guide-bars 5 and 6, and how the latter can be placed in an upward position with relation to the camera-bed, whenever desirable. It further illustrates how the motive power for the sleeve 7, can be applied from a crank 12$^a$, fitted to the corner-plate 11, and by means of an endless chain 12$^b$, instead of by the rack and pinion, as shown in Figs. 1 and 2. In this type of construction the pivot pin 19, in the corner-block 11, carries besides the sprocket 16, a pinion 21$^a$, meshing with the inverted stationary rack 21. This arrangement causes the carriage to travel longitudinally over the supporting-track 27, an equal distance as the sleeve 8, travels vertically along the guide-bar 6. A groove in the upper face of the rack 21, serves as a track for the guide-wheel 75, pivoted on a suitable bracket carried by the brace-rods 36, so as to maintain the device in a vertical position.

In Fig. 6, is ilustrated a further modification of how the sleeves 7 and 8, may be automatically connected and disconnected with the driving shaft running parallel to the camera-bed and so arranged as to be conveniently operated by the photographer, while standing at his work behind the ground glass. A shaft 61, is carried in brackets 64 and 65, attached to the corner-piece 11. Between these brackets a worm 56, is slidably mounted on the shaft 61, and caused to rotate with it by means of a key or other convenient means. The hub of the worm extends either way and ends in half clutches designed to engage in corresponding halves 57$^a$ and 59$^a$, forming parts of the spiral-gears 57 and 59. The illustrated position of the said movable parts, shows their relative position after the sleeve 7, has been moved inward to its central position. The oscillatory fulcrumed slide 10, is provided with a lug 67, from which a pin 71, projects transversely, and engages in a slot of the bell-crank lever 52$^a$, supported by a bracket 53. This lever is slotted in order to allow the required diagonal adjustment of the fulcrumed slides 10, in the extension 9$^a$, of the corner-piece 11. The pin 71, causes the lever 52$^a$, to rock around its own pivot in harmony with the oscillatic of the fulcrumed slide 10, and will reach its central position together with the slide 10, whatever may be its adjustment in the extension 9$^a$. The lower extremity of the lever 52$^a$, is in the form of an arc of a circle from its center point and notched in the middle, thereby allowing the pin 66, at the end of the swinging arm 66$^a$, pivoted at 66$^b$, in the bracket 53, as clearly shown in Figs. 6 and 6$^a$ to be lifted by a suitable spring 54$^a$, out of the recessed upper side of the connector 54, which itself rests on a roller 72$^a$, mounted on the stud 72, carried by the bracket 53. The freeing of the connector 54, permits the worm-teeth of the lower half of the lever 55, to engage with the worm 56, which will then cause the lever 55, to oscillate, until the other recess of the connector 54, registers with the pin 66. The continued rotation of the shaft 61, will then cause the worm 56, to slide out of engagement with the spiral-gear 59, which meshes with the spiral gear 60, operating the chain 12$^b$ and finally to engage in the hub of the spiral-gear 57. In the meanwhile continued rocking of the fulcrumed slide 10, and lever 52$^a$, will cause the pin 66, to embed itself in the opposite recess of the connector 54, which, by reason of its not being exactly opposite the pin 66, will cause, at the same time, a slight additional movement of the lever 55, whereby the worm teeth of this lever will be brought just beyond the reach of the end of the worm 56. The driving power of the shaft 61, is now transmitted to the sleeve 8 through the spiral gears 57 and 58, and the chain 32$^a$, and will continue to move the said sleeve, until by the rotation of the shaft 61, in a reverse direction, the sliding rods 1 and 2, are brought again into their central position. The distance between the inner clutch surfaces 57$^a$ and 59$^a$, of the spiral gears 57 and 59, prevents the worm 56, to ever engage both simultaneously, so that the shaft 61, will rotate for a short period, without driving either slide-block. Furthermore the gear sets 57, 58 and 59, 60, are so proportioned that any one of the said wheels may be either a driver or a driven wheel. The movement of the plate and lens supporting frames is derived from the said sleeves 7 and 8, and by the same devices as are illustrated in Fig. 5, and Fig. 7. Fig. 7, also illustrates how by means of the bracket 62 and rollers 63, the mechanism is kept upright, while traveling along the guide 38, and over the support 27.

The manner of operating the focusing apparatus of either type hereinbefore described is as follows:—First, the focal length of the lens to be operated by the device is accurately measured and divided by any of the gear proportions indicated in the foregoing description, which will give a quotient between 6 and 7. For instance, if the focal length be 16.25 inches, we divide by $2\frac{1}{2}$ and get 6.5 as quotient. The diameters of the pinions and spur-wheels operating the tooth-racks described in Figs. 1, 2 and 4, or the sprockets described in Figs. 3, 5, 6 and 7, operating the lens and plate driving chains, are regulated to agree with the proportion 1 to $2\frac{1}{2}$; next the distance of the center of the oscillatory fulcrumed block 10, is adjusted to be exactly $6\frac{1}{2}$ inches, from the lines through which the centers of the pivot-blocks 3 and 4, Figs. 1, 2, 3, 6 and 7, move; then the slide-rods 1 and 2, are brought to their central position as shown in Fig. 3. With the focusing mechanism in such adjustment, the lens-support is placed at a point so that the distance between the object and the first nodal point of the lens is exactly 32.5 inches and in this position the lens-support is firmly clamped to the upper stretch of the chain provided for driving it. Next the image-support is moved to the position which brings the image-plane at exactly 32.5 inches behind the second nodal point, in which position, the said image-support is also firmly clamped to the chains provided for driving the same. The equipment is now properly adjusted in all its parts to produce an image in equal size to the object and any movement imparted by the operating devices described for each type of construction, will cause the lens and the image surface to always move in proper relation to each other, to maintain sharp images of various sizes dependent upon the distance between the object and the lens and within the capacity or limits of magnification or reduction for which the device is designed.

It will be manifestly obvious to those skilled in the art to which this invention appertains, that still further modifications as to details in arrangement of the device may be made and still come within the spirit as well as scope of my said invention; and hence I wish it to be understood that I do not limit myself to all the detailed arrangements of the same, as shown; but

Having thus described the nature and objects of my invention, what I claim as new and desire to secure by Letters Patent, is:—

1. In an automatic focusing apparatus for photographic lenses, a pair of guide-ways arranged at right angles to each other, a sleeve movable along each of said guide-ways, two slide-rods engaging said sleeves, each of said sleeves carrying the pivot for one slide-rod and a guide for the other slide-rod, and an oscillatory fulcrum-slide through which both of said slide-rods are guided, substantially as and for the purposes described.

2. In an automatic focusing apparatus for photographic lenses, a pair of guide-ways arranged at right angles to each other, a sleeve movable along each of said guide-ways, two adjacent slide-rods engaging said sleeves, said slide-rods respectively terminating in said sleeves, and an oscillatory fulcrumed slide through which both of said slide-rods are guided, substantially as and for the purposes described.

3. In an automatic focusing apparatus for photographic lenses, guide-ways arranged at right angles to each other, sleeves movable along said guide-ways, two slide-rods respectively engaging with and terminating in said sleeves, and a driving mechanism for said sleeves, substantially as and for the purposes described.

4. In an automatic focusing apparatus, a carriage comprising guide-ways arranged at right angles to each other, sleeves movable along each of said guide-ways, each of said sleeves carrying a pivot and a slide, rods attached to said pivots and guided in said slides, driving-mechanism for said sleeves, an oscillatory fulcrumed slide guiding said rods, a rocker-arm carried by said fulcrumed slide, and operative connections between said rocker-arm and driving-mechanism to lock and unlock said sleeves to and from said driving-mechanism.

5. In an automatic focusing apparatus, a carriage, comprising guide-ways arranged at right angles to each other, a sleeve movable along each of said guide-ways, a rod pivoted to each of said sleeves, a lens supporting frame, operative connections to transmit the movement of one of said sleeves to said lens supporting frame, a frame carrying a plate support, and operative connections to transmit the movement of the other of said sleeves to said plate support.

6. In an automatic focusing apparatus for photographic lenses, sliding-blocks, tracks, said sliding-blocks guided along said tracks at right-angles to each other, a sliding-rod pivoted to each of said sliding-blocks and slidably guided through the other of said sliding-blocks, a lens-supporting frame, operative-connections to transmit in equal, increased, or decreased ratio, the movement of one of said sliding blocks to said lens-supporting frame, a plate-supporting frame, and operative connections to transmit the movement of the other of said sliding-blocks in equal, increased, or decreased ratio, to said image-supporting frame, substantially as and for the purposes described 7. In an automatic focusing apparatus for photographic lenses, sleeves, guide tracks forming a carriage, said sleeves guided along said tracks at right angles to each other, a sliding rod pivoted to each of said sleeves and slidably guided through the other of said sleeves, a lens-support and lens, means whereby said lens-support is operatively connected with one of said sliding-rods, a stationary support for said guide tracks, and operative connections between one of said sleeves and the stationary support, whereby said guide tracks are caused to move longitudinally parallel to the axis of the lens the same distance as said last named sleeve moves in a path at right angles to the axis of said lens.

8. In an automatic focusing apparatus for photographic lenses, a stationary support, sleeves, guide tracks forming a carriage, said sleeves guided along said tracks at right angles to each other, two adjacent slide-rods engaging said sleeves, one of said slide-rods pivoted to each of said sleeves and slidably guided through the other of said sleeves, a driving-mechanism to move said sleeves along said guide tracks, a fulcrumed slide guiding both of said slide-rods, operative connections between said fulcrumed slide and driving-mechanism to engage and disengage said sleeves to and from said driving-mechanism, a lens, supports for said lens and for an image, and operative connections between one of said sleeves and said stationary support, whereby said guide tracks are caused to move parallel to the axis of said lens, through the same distance as said last-named sleeve moves at right angles to the axis of said lens.

9. In a focusing apparatus for photographic lenses, an object-support, a lens-support, an image-support, means to establish and maintain the conjugate-foci in shiftings of said image support or lens support to enable thereby the image to bear an exact predetermined ratio of enlargement or of reduction to the object, one element of said means terminating in and moving along a path at an angle to the path of motion and termination of another like element of said means, a fulcrum having provision for both of said elements to be guided through the same, and operative connections between the terminals of said like elements causing said terminals to move in paths located at right angles to each other.

10. In a focusing apparatus for photographic lenses, an object, a lens-support, an image-support, means to automatically establish and maintain the conjugate-foci in any shiftings of said image-support or lens support to enable thereby the image to bear an exact predetermined ratio of enlargement or of reduction to the object, one element of said means terminating in and moving through a path at right angles to the path of motion and termination of another like element of such means, a fulcrum slide having provision for both of said elements to slide through the same and operative connections between the terminals of said like elements causing said terminals to move in paths located at right angles to each other.

11. In a focusing apparatus, an object support, a lens support, and an image support, a carriage comprising guide-ways arranged at right angles to each other, and means movably connected with said guide-ways, one element of said means terminating in and moving through a path at right angles to the path of motion and termination of the other element of said means, a fulcrum-slide having provisions for both of said elements to be guided through the same and operative connections between said means and said object-support, lens-support and image-support, respectively, substantially as and for the purposes described.

12. In a focusing apparatus for photographic lenses, an object-support, a lens-support, an image-support, and means, one element of which terminates in and moves through a path at right angles to the path of motion and termination of another like element of such means, a fulcrum slide having provision for both of said elements to be guided through the same operative connections between the terminals of said like elements causing said terminals to move in paths located at right angles to each other, and operative-connections to transmit in the same, increased, or decreased ratio, the movement of the terminal of one of said like elements to the lens-support, and in the same, increased, or decreased ratio, the movement of the terminal of the other like element to said image-support, substantially as and for the purposes described.

13. In a focusing apparatus for photographic lenses, two tracks, two sleeves guided by said tracks, two slide-rods, each of said slide-rods pivoted to one of said sleeves and slidable through the other of said sleeves, a lens-support, a plate-support, and means to impart the movement of said sleeves respectively, to each of said supports to cause the relative movement of the latter to always equal in proportion the relative movement of said sleeves, substantially as and for the purposes described.

In witness whereof, I have hereunto set my signature in the presence of the two subscribing witnesses hereto.

LODEWYK J. R. HOLST.

Witnesses:
 ELISABETH A. SHELDRAKE,
 THOMAS M. SMITH.